Jan. 22, 1924.
M. C. BERSTED
GREASE GUN HOSE COUPLING
Filed Aug. 9, 1920
1,481,341
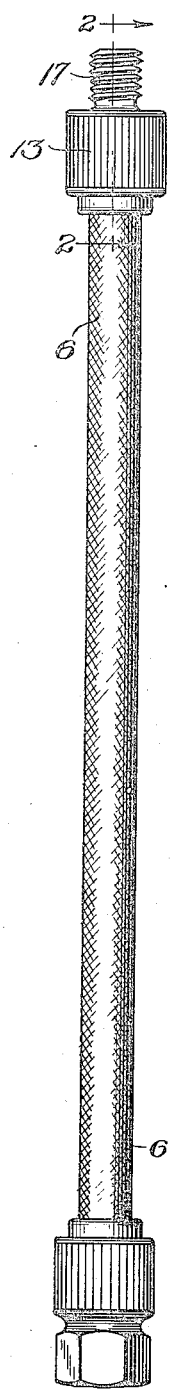
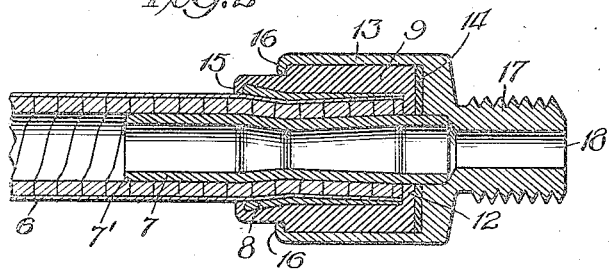
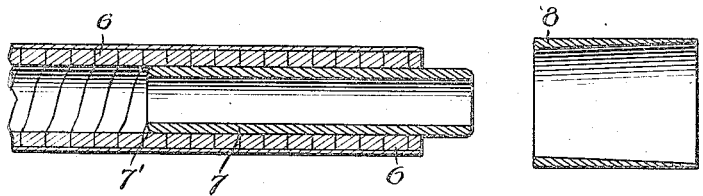
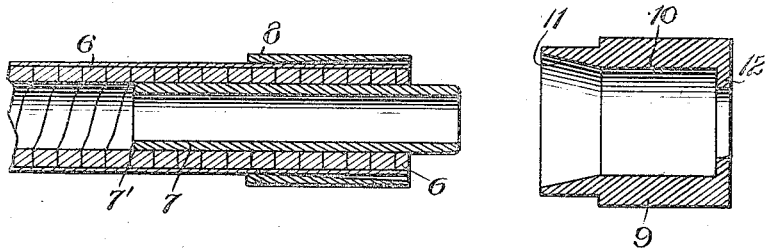
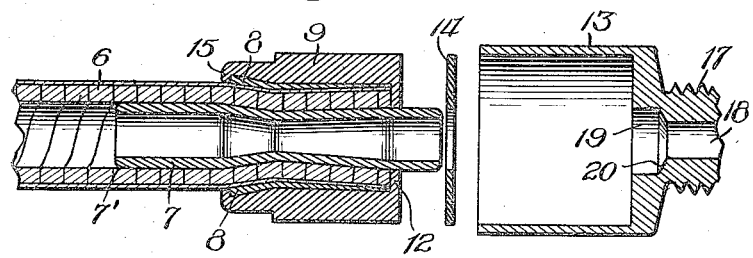
Inventor
Martin C. Bersted,
By Wm O Bell
Atty.

Patented Jan. 22, 1924.

1,481,341

UNITED STATES PATENT OFFICE.

MARTIN C. BERSTED, OF CHICAGO, ILLINOIS.

GREASE-GUN HOSE COUPLING.

Application filed August 9, 1920. Serial No. 402,280.

*To all whom it may concern:*

Be it known that I, MARTIN C. BERSTED, a citizen of the United States, residing at Chicago, in the county of Cook and State of Illinois, have invented certain new and useful Improvements in Grease-Gun Hose Couplings, of which the following is a specification.

This invention relates to a grease gun which is adapted to be connected by a short length of hose to a cup and operated to force grease into the cup and to the bearing under considerable pressure thereby insuring adequate lubrication.

Heretofore, so far as I am aware, the hose has been provided with a swivel connection for engagement with the grease cup, but the pump coupling has always been rigid with the hose. This rigid connection has been used because it was assumed that the gun and hose would first be engaged and either one could be turned relatively to the other in screwing them together. Also in order that the gun and hose might be turned together to engage the hose with the grease cup, as a convenient manner of applying the gun to working position. But the results in the commercial manufacture and use of such devices have been unsatisfactory for the following reasons: Flexible metal hose is used and the coupling has been soldered thereto. This causes a crystallization and deterioration of the hose which results in the hose breaking at the coupling. In other respects it has been found to be an unsatisfactory method for connecting such parts, especially as they are subjected to rough and indifferent handlings. Furthermore, the hose and gun are often connected in a careless manner or by unskilled persons with the result that the joint between the hose and gun is subjected to excessive strain until it finally weakens and gives way. It will be understood that these guns are capable of producing a pressure of 200 pounds or more to the square inch and the parts must be substantially made and securely joined together.

My invention relates particularly to the coupling at either end of the hose and its object is to provide a strong and substantial joint without the use of solder by coupling made parts together into interlocking engagement which will withstand any amount of rough usage to which such parts may be subjected.

Another object is to provide swivel couplings at both ends of the hose to enable more effective engagement of the hose with the gun and with the grease cup, without straining the coupling connections with the hose and without twisting the hose.

And a further object is to construct the coupling in a simple manner, comprising but few parts which can be easily and permanently and securely assembled on the hose end.

In the drawings I have shown a selected embodiment of the invention which so far has proved entirely satisfactory, and referring thereto, Fig. 1 shows a complete hose for connecting the gun with the grease cup.

Fig. 2 is an enlarged sectional view on the line 2—2 of Fig. 1.

Fig. 3 is a tightly assembled sectional view showing the tube in place in the hose and the bushing in position to be applied.

Fig. 4 is also a sectional view showing the tube and bushing in place and the sleeve in position to be applied.

Fig. 5 shows a tube, bushing and sleeve in place and the shell in position to be applied.

Referring to the drawings, 6 is the hose which is made of suitable material with a flexible metal covering and is generally referred to in the trade as flexible metal hose. Any suitable form of hose may be employed but to withstand the pressure and the rough usage to which such devices are subjected, it is desirable to use hose of this character. A soft metal tube 7 is inserted in the end of the hose with its end projecting therefrom. A bushing 8 straight outside and tapered inside is arranged on the hose with its flared end at the end of the hose, and a sleeve 9 is forced into place on the bushing. This sleeve has a straight bore 10 and an inwardly projecting shoulder 12 at its outer end. The flared end 11 of the sleeve will fit easily over the flared end of the bushing but the diameter of the bushing is about $\frac{1}{16}$ inch larger than the diameter of the straight bore of the sleeve, wherefore considerable pressure is required to force the sleeve into the bushing and the result is that the hose and tube will be compressed intermediate of the ends of the bushing to form a lock joint between the hose and the tube and between the hose and the sleeve, the bushing acting, in a sense, as a wedge tightly and securely locking all of the parts together. An outer shell 13 is arranged over the sleeve and a washer 14 is interposed between the outer end of the sleeve and the shell. The inner edge 15 of the sleeve is turned inwardly to engage the inner end of the bushing and the inner edge 16 of the shell is turned inwardly to swivelly engage the shell with the sleeve. The shell has a threaded end 17 to be connected with the pump and this end has a bore 18 which connects with a larger bore 19 having a tapered shoulder 20. The inner end 7' of the tube 7 is rounded to avoid injury to the hose and the outer end of the tube engages the shoulder 20 in the sleeve, the said end of the tube fitting snugly in the bore 19.

My invention provides a very simple, strong and substantial, and easily assembled coupling for a hose connection between a grease gun and a grease cup, and it may be used with satisfactory results for many other purposes as will be readily apparent to those skilled in the art. It provides the necessary tight joint between the coupling and the hose to avoid leakage, and it is constructed and applied in such a way that injury to the hose is entirely avoided. It is true, of course, that the hose is considerably distorted by compression within the coupling but it will be noted that this is wholly within the coupling and does not constitute a weakness. On the contrary the coupling forms a very strong and substantial end for the hose. The inner end of the tube projects beyond the inner end of the shell so that the hose will always be held substantially straight for a short distance beyond the shell and this prevents the hose from being worked laterally with relation to the sleeve and bushing and in this way also prevents wear and prolongs the life of the hose. It is found in practice that when the sleeve is forced on the bushing the latter is not only compressed between its ends, as shown in Figs. 2 and 5, but it is also crimped and tightly engaged with the sleeve so that the hose may not turn in the couplings relatively thereto.

The embodiment of the invention illustrated in the drawing has been found to be satisfactory for the purposes intended but I reserve the right to make all such changes therein as may be required for different purposes and to meet different conditions, so far as the same shall fall within the scope of the following claims.

I claim:

1. The combination with a hose, of a tube arranged within the end of the hose, a bushing on the hose at the end thereof, a compression sleeve on the bushing compressing the bushing and the tube between their ends to make interlocking engagement between the tube, the hose and the sleeve, and an outer shell swivelly secured on the sleeve.

2. The combination with a hose, of a tube arranged within the end of the hose, a bushing on the hose at the end thereof, a compression sleeve enclosing the bushing on the hose and compressing the bushing and the tube between their ends to make interlocking engagement between the tube, the hose and the sleeve, and an outer shell swivelly secured on the sleeve.

3. The combination with a hose, of a tube arranged within the end of the hose, an interiorly tapered bushing arranged on the hose with its flared end at the outer end of the hose, a compression sleeve forced into place on the bushing and compressing the bushing and the tube between their ends to make interlocking engagement between the tube, the hose and the sleeve, and an outer shell swivelly secured on the sleeve.

4. The combination with a hose, of a tube arranged within the end of the hose, an interiorly tapered bushing arranged on the hose with its flared end at the outer end of the hose, a compression sleeve having a straight bore with a flared end adapted to be forced into place lengthwise on the bushing and compressing the bushing and the tube between their ends to make interlocking engagement between the tube, the hose and the sleeve, and an outer shell swivelly secured on the sleeve.

5. The combination of a hose, of a tube arranged within the end of the hose, an interiorly tapered bushing on the hose at the end thereof, a compression sleeve having a straight bore with a flared end adapted to be forced lengthwise on the bushing and compressing the bushing and the tube between their ends to make interlocking engagement between the tube, the hose and the sleeve, an outer shell swivelly secured on the sleeve, the inner end of the sleeve being turned inward over the inner end of the bushing and the inner end of the shell being engaged with the sleeve.

6. The combination with a hose, of a tube arranged within the hose and projecting from the end thereof, an interiorly tapered bushing on the hose at the end thereof, the flared end of the bushing being located at the end of the hose, a compression sleeve having a straight bore, a flare at one end and an inwardly directed shoulder at the other end of the bore, said sleeve being forced lengthwise on the bushing and compressing the bushing and the tube between their ends to make interlocking engagement between the tube, the hose and the sleeve, and an outer shell swivelly secured on the sleeve.

7. The combination with a hose, of a cylindrical bushing on the hose, and a sleeve having a flared end of larger diameter than the bushing and merging into a straight bore of smaller diameter than the bushing and adapted to be forced upon the bushing to compress and distort the bushing and hose whereby to form a lock joint between the hose and the sleeve.

8. The combination with a hose, of a tube arranged within the hose and projecting beyond the end thereof, an outer shell having a bore to receive the end of the tube, and means for swivelly connecting the shell to the hose and for securing the tube in the hose.

9. The combination with a hose, of a tube arranged within and projecting from the end of the hose, a sleeve secured on the end of the hose, compression means between the sleeve and the hose for locking the tube within the hose and the sleeve on the hose, an outer shell swivelly secured on the sleeve and having a bore to receive the end of the tube, and a washer interposed between the shell and the sleeve.

10. The combination with a hose, of a cylindrical bushing on the hose, and a sleeve having a smooth flared end of larger diameter than the bushing and merging into a smooth straight bore of smaller diameter than the bushing and adapted to be driven upon the bushing to compress and distort the bushing and hose and form a lock joint between the hose and the sleeve.

MARTIN C. BERSTED.